(12) United States Patent
Kelly et al.

(10) Patent No.: US 7,865,058 B2
(45) Date of Patent: Jan. 4, 2011

(54) APPARATUS FOR RECEIVING A DIGITAL INFORMATION SIGNAL COMPRISING A FIRST VIDEO SIGNAL PRODUCING IMAGES OF A FIRST SIZE, AND A SECOND VIDEO SIGNAL PRODUCING IMAGES OF A SECOND SIZE SMALLER THAN THE FIRST SIZE

(75) Inventors: Declan Patrick Kelly, Eindhoven (NL); Wilhelmus Jacobus Van Gestel, Eindhoven (NL); Wiebe De Haan, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1035 days.

(21) Appl. No.: 10/528,933

(22) PCT Filed: Sep. 25, 2003

(86) PCT No.: PCT/IB03/04171

§ 371 (c)(1), (2), (4) Date: Mar. 23, 2005

(87) PCT Pub. No.: WO2004/030351

PCT Pub. Date: Apr. 8, 2004

(65) Prior Publication Data

US 2006/0056810 A1 Mar. 16, 2006

(30) Foreign Application Priority Data

Sep. 26, 2002 (EP) .................................. 02079057

(51) Int. Cl.
*H04N 5/76* (2006.01)

(52) U.S. Cl. ..................... 386/95; 348/565; 386/126
(58) Field of Classification Search ................ 386/46, 386/122, 95, 108, 124–126; 348/565–568
See application file for complete search history.

(56) References Cited

U.S. PATENT DOCUMENTS

| | | | | |
|---|---|---|---|---|
| 5,598,222 A | * | 1/1997 | Lane | 348/568 |
| 5,784,528 A | * | 7/1998 | Yamane et al. | 386/112 |
| 5,907,659 A | * | 5/1999 | Yamauchi et al. | 386/95 |

(Continued)

FOREIGN PATENT DOCUMENTS

JP 04313984 * 11/1992

(Continued)

OTHER PUBLICATIONS

The "ISO/IEC 13818-2 : 2000(e)" standard; 2000.*

(Continued)

*Primary Examiner*—David E Harvey

(57) ABSTRACT

The invention relates to an apparatus for receiving a first and second video signal. The first video signal represents a sequence of images having a first size, and the second video signal representing a sequence of images having a second size, the second size being smaller then the first size of the images. The apparatus combines said first and second video signal so as to obtain a composite video signal suitable for displaying on a display unit. The signal combination means being adapted to combine the first and second video signal while the size of the images corresponding to the second video signal remains unchanged.

8 Claims, 1 Drawing Sheet

U.S. PATENT DOCUMENTS

Figure 1:
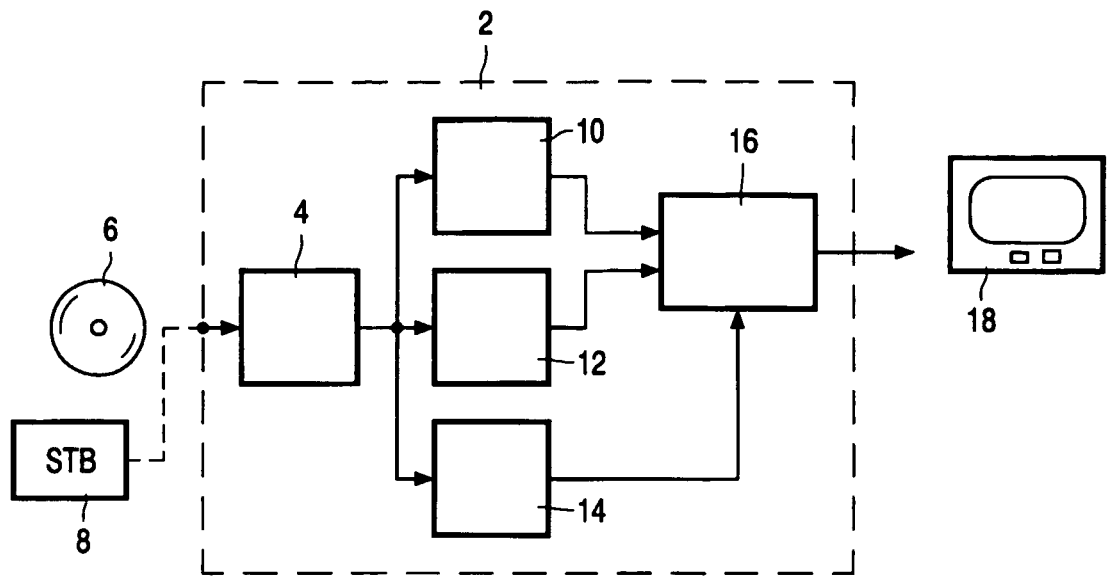

| | | | |
|---|---|---|---|
| 6,069,669 A | 5/2000 | Park et al. | |
| 6,070,236 A * | 5/2000 | Winter | 712/209 |
| 6,075,906 A * | 6/2000 | Fenwick et al. | 382/298 |
| 6,415,101 B1 * | 7/2002 | deCarmo et al. | 386/105 |
| 6,741,617 B2 * | 5/2004 | Rosengren et al. | 370/536 |
| 6,771,278 B2 * | 8/2004 | Shigeta | 345/634 |
| 6,778,224 B2 * | 8/2004 | Dagtas et al. | 348/586 |
| 7,231,603 B2 * | 6/2007 | Matsumoto | 715/716 |
| 7,471,834 B2 * | 12/2008 | Sull et al. | 382/232 |
| 2001/0048481 A1 * | 12/2001 | Hatano et al. | 348/473 |
| 2002/0034375 A1 | 3/2002 | Suda | |
| 2002/0047914 A1 * | 4/2002 | Rosengren et al. | 348/384.1 |
| 2002/0047918 A1 * | 4/2002 | Sullivan | 348/397.1 |
| 2002/0120498 A1 * | 8/2002 | Gordon et al. | 705/14 |
| 2002/0140862 A1 * | 10/2002 | Dimitrova et al. | 348/565 |
| 2002/0176508 A1 * | 11/2002 | Boyce et al. | 375/240.25 |
| 2003/0026423 A1 * | 2/2003 | Unger et al. | 380/217 |
| 2009/0016438 A1 * | 1/2009 | McDade et al. | 375/240.16 |

FOREIGN PATENT DOCUMENTS

| | | | |
|---|---|---|---|
| JP | 10-241262 | * | 3/1997 |
| JP | 10215409 | * | 8/1998 |
| JP | 2001309350 | * | 11/2001 |
| KR | 2001-004940 | * | 1/2001 |
| WO | 0105144 A1 | | 1/2001 |
| WO | WO0247393 A1 | | 6/2002 |

OTHER PUBLICATIONS

Machine translation of Korean application #KR 2001004940 to Jo.*

* cited by examiner

APPARATUS FOR RECEIVING A DIGITAL INFORMATION SIGNAL COMPRISING A FIRST VIDEO SIGNAL PRODUCING IMAGES OF A FIRST SIZE, AND A SECOND VIDEO SIGNAL PRODUCING IMAGES OF A SECOND SIZE SMALLER THAN THE FIRST SIZE

The invention relates to an apparatus for receiving a digital information signal comprising at least a first and second video signal, said apparatus comprises:

receiving means for receiving said digital information signal;

first retrieval means for retrieving said first video signal from the digital information signal;

second retrieval means for retrieving said second video signal from the digital information signal;

signal combination means for combining said first and second video signal so as to obtain a composite video signal suitable for displaying on a display unit.

The invention further relates to record carrier carrying a digital information signal and an apparatus for providing a digital information signal.

An arrangement defined above is commonly known. Such an arrangement, for example a digital TV, comprises the feature Picture in Picture (PIP) or Split-screen. With this feature it is possible to view simultaneously two different broadcast programs. Both programs are received with full resolution. The bandwidth of the input has to be two times the bandwidth needed to receive one program. In the case of the feature Picture in Picture, one of the two programs has to be reduced before the images of said program could be combined with the other program so as to obtain the PIP image.

Nowadays, service providers add additional video or still picture slide show content to a video signal to enhance their product. Examples are multi-angle feature and director commentary feature of DVD. In the first case one could view a scene from another direction. Both Digital TV systems and DVD support a multi-angle feature but in both cases the user must choose only one of the angles to view and all angles are included at full screen resolution.

It is an object of the invention to provide an arrangement for receiving a digital signal with improved interactivity so as to enhance video with additional video content.

The arrangement in accordance with the invention is characterized in that characterized in that the first video signal represents a sequence of images having a first size, and the second video signal representing a sequence of images having a second size, the second size being smaller then the first size of the images, the signal combination means being adapted to combine the first and second video signal while the size of the images corresponding to the second video signal remains unchanged. The size of an image could be defined in the number of horizontal and vertical pixels.

The invention is based on the following recognition. Up till now, the images of two video programs transmitted in the form of an MPEG transport stream via a record carrier or broadcast are full screen. In the event the two video programs are recorded on a record carrier they could be stored in two different transport streams. To be able to produce a PIP screen, both video programs has to be received completely and one of the programs has to be processed to obtain the PIP-images, which has a reduced size. In the event they are read from a record carrier, the reading head and input circuitry should be able to read and process both streams simultaneously or real-time. Therefore, these devices should have a high bandwidth. In optical reproducing devices this becomes critical. Furthermore, circuitry is needed to reduce the size of the images of one of the video programs. The images of the additional video signal to enhance a video program (main video) with multi-angle feature or "director's commentary" have a direct relationship with specific parts of said video program. These images have to be displayed simultaneously with the main video. Therefore, according to the invention the additional video signal is transmitted/recorded in a PIP-format. This has the advantage that it reduces the bandwidth needed to receive both the main video and the additional video information. Furthermore, no special hardware/software is needed to reduce images of the additional video signal prior to combining said reduced images with the main video so as to obtain the PIP-images.

This invention is a very advantageous feature for published discs as additional video content can be added to the main video program without changing the original video material. This additional video (or still picture slide show) content will be overlaid on top of the main video in a window that takes up usually only a small part of the screen. This feature can be used in many ways depending on the content. One example is an enhancement of the "director's commentary" feature of DVD. In this case, instead of only hearing the directors voice, you could also see the directors face, see storyboards or see 'making of' footage as the director explains the scene. For other types of content (e.g. documentaries, sports), the PIP feature can be used in different ways. The invention improves the interactivity with main video programs on a published disc.

A further embodiment of the arrangement according to the invention is characterized in that the digital information signal further comprises a parameter signal indicative for the location where the second video signal has to be overlaid on top of the first video signal, the apparatus further comprises third retrieval means for retrieving the parameter signal, the signal combination means further being adapted to overlay the second video signal on top of the first video signal in dependence of said parameter.

An advantage of such a parameter is that editors has the possibility to position the images of the second video signal in such a location in the images of the first video signal that the images of the second video signal only covers an un- or less important part of the images of the first video signal. In this way the viewer can see the relevant parts of the first video signal.

Figure 2:
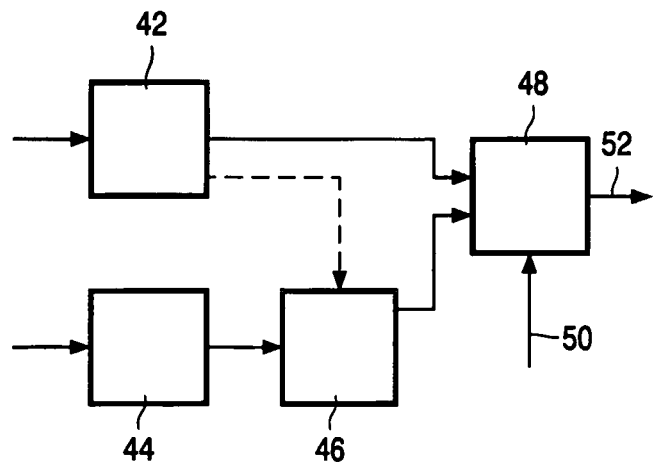

These and other aspects of the invention will be apparent from and elucidated by means of three embodiments with reference to the drawings in which Embodiments of the invention will now be described in more detail, by way of example, with reference to the drawings, in which FIG. 1 shows an arrangement for receiving a digital information signal in accordance with the invention, FIG. 2 shows an arrangement for providing a digital information signal in accordance with the invention.

FIG. 1 shows an apparatus 2 for receiving a digital information signal comprising a first and second video signal. The first video signal is the main video and the second video signal is the additional video content. The apparatus comprises a receiving unit 4 for receiving said digital information signal. The receiving unit could comprise a reading unit not shown, for reading the information signal from a record carrier, such as an optical disc 6. However, the receiving unit could also be connected to a reading unit or a set-top box 8, which is capable of retrieving both the main video and the additional video content and to provide this information in said digital information signal to the apparatus 2. The digital information signal is preferable in the form of an MPEG transport stream. The main video is in full screen size and the additional content is in reduced size, the size of the PIP-window.

The apparatus further comprises a first retrieval unit 10 for retrieving the main video signal from the digital information signal and second retrieval unit 12 for retrieving the additional video content from the digital information signal. The main video signal and the additional video information are supplied to a signal combination unit 16. The signal combination means is arranged for combining the main video and the additional video content so as to obtain a composite video signal suitable for displaying on a display unit 18.

The main video is retrieved in full resolution or full size. The images of the additional video content are not in full size. When these images are displayed on a display without any scaling they will fill only a part of the screen. In other words the additional video content has a reduced resolution when displayed in full screen format. The signal combination unit is adapted to combine the first and second video signal without changing the size of images of the additional video content.

Preferably the second video stream is included along with the main video stream in the multiplex on a disc. The secondary video stream will have lower resolution than the original and will be displayed as a Picture in Picture. Preferably the additional video content is multiplexed with the main video.

To control this PIP feature there are two basic approaches, one is to define the PIP stream in the multiplex and the other is to define it in the metadata information (PlayList or ProgramInfo).

PlayLists are known from DVD. The PlayLists are shown to the user in the UI and the user can choose to play one. The PIP feature could be defined as a separate PlayList which the user can choose. To enable this the PlayList has to indicate the elementary streams to present. To enable this the PlayItem structure is extended to specify the Elementary Stream (indicates with program identifiers PIDs) to present and should allow indicating the PIP stream as well as the main video stream.

ProgramInfo structure is known from the Digital Video Recorder standard (DVR) and defines the audio and video PIDs in the recorded Transport Stream. This structure is preferably extended to specify that certain streams are intended as PIP streams. For example, each stream is specified using a StreamCodingInfo table, this could be extended to specify that a stream is a PIP stream and should be displayed over the main video if the user specifies it (and the system supports it).

In the Transport Stream the Programme Map Table indicates the elementary streams in the multiplex. Each stream has an associated stream type indicating if it's audio or video and the coding type. In accordance to the invention the stream_type field allows PIP streams to be specified, for example, one of User Private values could be defined to indicate PIP streams (e.g. one for video and one for associated audio).

The user-data in the picture header should contain the following information:
  Size of the PIP (pixels hor/vert)
  Location of the PIP in the main picture (It should always be presented at a location where the Main picture does not contain valuable information e.g the ball/goal in a football game). The location information may also take into account different aspect ratios and display formats.
  The blending with the Main picture.
  the corresponding audio PID, to identify which audio stream in the transport stream has to be used.

The apparatus in FIG. 1 comprises further a third retrieval unit 14 for retrieving the user-data defined above. This data is supplied to the signal combination unit 16 to control the signal combination unit.

For a Program Stream the solution would be to reserve one (or more) of the video stream_ids for the PIP or indicate that that stream_id is intended as a PIP and should not be displayed as full screen video. Alternatively, reserved Stream_ids used in PES headers can be defined for PIP streams.

In an other embodiment of the invention the first video signal is retrieved from a record carrier, such as an optical disc and the second video signal is retrieved from another storage medium. Said recording medium carrying the first video signal could comprise links (URL's) or other suitable indicators to the location of the second video signals. Said other storage medium carrying the second video signal could be an optical disc, or a medium, which is accessible via a wired or wireless connection, such as the internet or a network server. In this embodiment the apparatus comprises a receiving unit for receiving the first video signal and a control signal to enable said apparatus to retrieve the second video signal and another receiving unit for receiving the second video signal in dependence of said control signal. The control signal could comprises information where the apparatus can find the second video signal or could be an application, which offers the users a menu, this could be a WEB page, which enables a user to select a second video signal from several possible second video signals.

FIG. 2 shows an apparatus for providing a digital information signal in accordance to the invention. The apparatus comprises a first input unit 42 for receiving the main video and a second input unit 44 for receiving the video content to be added in full screen format or full resolution. The apparatus further comprises a video signal processing unit 46 arranged for reducing the size of the video content to be added so as to obtain video content in the form of PIP stream. The signal combination unit 48 combined the main video and the PIP stream so as to obtain the digital information signal, preferably in the form of an MPEG transport stream. The digital information signal could be transmitted or recorded on a record carrier, such as an optical disc.

Signal 50 could be supplied to the signal combination unit to include in the digital information signal the user data, identifying which streams are PIP streams and the location of the PIP window in the screen and other suitable PIP control information. Signal could by generated manually in a studio or automatically by image analysis tools. The analysis tools determined unimportant parts in the main video images. These part are used to display the PIP window.

Though the invention is described with reference to preferred embodiments thereof, it is to be understood that these are non-limitative examples. Thus, various modifications are conceivable to those skilled in the art, without departing from the scope of the invention, as defined by the claims. Selecting the PIP feature may cause a different audio track to be presented (e.g. director's commentary) or it may leave the audio unchanged (e.g. reverse angle PIP in sports disc). The PIP feature may appear for only specific portions of the main video or it may be presented throughout the complete content.

The use of the verb "to comprise" and its conjugations does not exclude the presence of elements or steps other than those stated in a claim. Furthermore, the use of the article "a" or "an" preceding an element does not exclude the presence of a plurality of such elements. In the claims, any reference signs placed between parenthesis shall not be construed as limiting the scope of the claims. The invention may be implemented by means of hardware as well as software. Several "means" may be represented by the same item of hardware. Furthermore, the invention resides in each and every novel feature or combination of features.

The invention claimed is:

1. An apparatus for receiving a digital information signal comprising at least a first video signal and second video signal, said apparatus comprises:
   a receiver for receiving said digital information signal;
   first retrieval unit for receiving said digital information signal and retrieving said first video signal from the received digital information signal;
   second retrieval unit for receiving said digital information signal and retrieving said second video signal from the received digital information signal; and
   signal combination unit for combining said first video signal and said second video signal so as to obtain a composite video signal suitable for displaying on a display unit,
   wherein the first video signal forms, on display, a sequence of images having a first size, and the second video signal forms, on display, a sequence of images having a second size, the second size being smaller than the first size of the images, the signal combination unit combining the first and second video signals while keeping the size of the images corresponding to the second video signal unchanged, and wherein the digital information signal further comprises a parameter signal indicative for the location where the second video signal has to be overlaid on top of the first video signal, and the apparatus further comprises third retrieval unit for receiving said digital information signal and retrieving the parameter signal, the signal combination unit overlaying the second video signal on top of the first video signal in dependence on said parameter signal.

2. The apparatus as claimed in claim 1, wherein the digital information signal is in the form of an MPEG transport stream.

3. The apparatus as claimed in claim 1, wherein the digital information signal is recorded on a record carrier, the receiver reading the digital information signal from said record carrier.

4. The apparatus of claim 1, wherein the receiver receives the first video signal from a first source and receives the second video signal from a second source which is different from the first source.

5. A record carrier in the form of a storage medium readable by a device, the record carrier having a digital information signal recorded thereon, the digital information signal comprising a first video signal and a second video signal, wherein the first video signal forms, on a display, a sequence of images having a first displayed size, and the second video signal forms, on the display, a sequence of images having a second displayed size, the second displayed size of the images being smaller than the first displayed size, wherein the digital information signal further comprises a parameter signal indicative for a location where the second video signal has to be overlaid on top of the first video signal when said first and second video signals are to be combined to form a composite video signal, and wherein the digital information signal further comprises a separate playlist comprising the second video signal and items having a displayed size smaller than the first displayed size for selection of the second video signal or the items by a user for display on the display.

6. An apparatus for providing a digital information signal, said apparatus comprising:
   an input unit for receiving a first video signal and a second video signal, the first video signal forming, on a display, a sequence of images having a first displayed size;
   a signal combination unit for combining said first and second video signals so as to form said digital information signal; and
   an output unit for providing said digital information signal,
   wherein the apparatus comprises video processor for processing the second video signal so as to obtain a processed second video signal forming, on the display, a sequence of images having a second displayed size, wherein the second displayed size is smaller than the first displayed size of the images, the signal combination unit combining the first video signal and the processed second video signal while retaining all video information in the first and processed second video signals so as to form said digital information signal, and a device for generating a control signal for indicating a location where the second video signal is to be overlaid on top of the first video signal, wherein the signal combination unit combines the control signal with the first video signal and the second video signal in forming the digital information signal, and wherein the digital information signal further comprises a separate playlist comprising the second video signal and items having a displayed size smaller than the first displayed size for selection of the second video signal or the items by a user for display on the display.

7. The apparatus as claimed in claim 6, wherein the output unit writes the digital information signal onto a record carrier.

8. The apparatus of claim 6, wherein the control signal comprises information where the apparatus can find the second video signal, and an application which offers users a menu to enables the user to select the second video signal from a plurality of second video signals.

* * * * *